United States Patent
Chung et al.

(10) Patent No.: US 7,286,891 B2
(45) Date of Patent: Oct. 23, 2007

(54) SYSTEM AND METHOD FOR CORRECTING MATERIAL AND DATA MISMATCH IN AN AUTOMATED MANUFACTURING ENVIRONMENT

(75) Inventors: Yung-Cheng Chung, Tainan (TW); Hsieh-Shyh Fu, Hsin-Chu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 42 days.

(21) Appl. No.: 11/370,649

(22) Filed: Mar. 8, 2006

(65) Prior Publication Data

US 2007/0213863 A1   Sep. 13, 2007

(51) Int. Cl.
*G06F 19/00* (2006.01)
(52) U.S. Cl. .................... 700/115; 705/22; 705/75; 705/404; 707/2
(58) Field of Classification Search ........... 700/115; 705/8, 10, 22, 24, 28, 75, 404; 707/1–10
See application file for complete search history.

(56) References Cited

U.S. PATENT DOCUMENTS

| | | | | |
|---|---|---|---|---|
| 6,381,509 | B1* | 4/2002 | Thiel et al. | 700/115 |
| 6,985,786 | B2* | 1/2006 | Wright | 700/115 |
| 2007/0005173 | A1* | 1/2007 | Kanitz et al. | 700/109 |

OTHER PUBLICATIONS

Kuhl, Michael E., et al., "Capacity Analysis of Automated Material Handling Systems in Semiconductor Fabs", Proceedings of the 2004 Winter Simulation Conference, pp. 1962-1966.

* cited by examiner

*Primary Examiner*—Leo Picard
*Assistant Examiner*—Sheela Rao
(74) *Attorney, Agent, or Firm*—Haynes and Boone, LLP

(57) ABSTRACT

A system comprises a parser operable to receive a log file containing detailed processing tool transactional data and generate an operation journal containing a subset of the detailed processing tool transactional data arranged in a known format, a comparator operable to receive automated material tracking data, and compare with the operation journal data, and an automatic correction module operable to automatically correct the automated material tracking data in response to a discrepancy between the automated material tracking data and the operation journal data.

24 Claims, 4 Drawing Sheets

```
m_jReaderType 1 iCommand 1 tmpp12->com_id_tag[iLP] 4 tmpp12->com_id_address_tag[iLP] 2
bad port 2 carrier id h 9 iReadStatus 0
cCarrierId PFB00013 iReadingRetry 0 csDataToRead 9 iPage 1 iRet 0 iPage 1 iDataSeg 1 m_IndexPage 0 iteration 2 iDataLength 16
Mon May 10 19:39:01 2005   Add carrier with carrier id:PFB00139

Mon May 10 19:39:01 2005   LOADING COMPLETE event (CEID=46) received on LP2
association A 1 ,B 2 ,C 0 ,D 0
Mon May 10 19:39:11 2005   4 Load Port: 1 CarrierID Status : ID_WAITING_FOR_HOST
CDOCarrierID::FiUserPrompt : CarrierID window displayed to the operator
Mon May 10 19:39:16 2005   Target lot 1 CarrierID: PFF000501
..... ..... ..... ..... ..... ..
NB_WAF_C1 13 wafer(s)
MAP_C1 1111111111011100000000000
NB_WAF_C2 0 wafer(s)
MAP_C2 000000000000000 0000000000
..... ..... ..... ..... ..... ..
Mon May 10 19:39:17 2005   end pick carrier 1 slot 6
Mon May 10 19:39:21 2005   end place carrier 2 slot 1
```

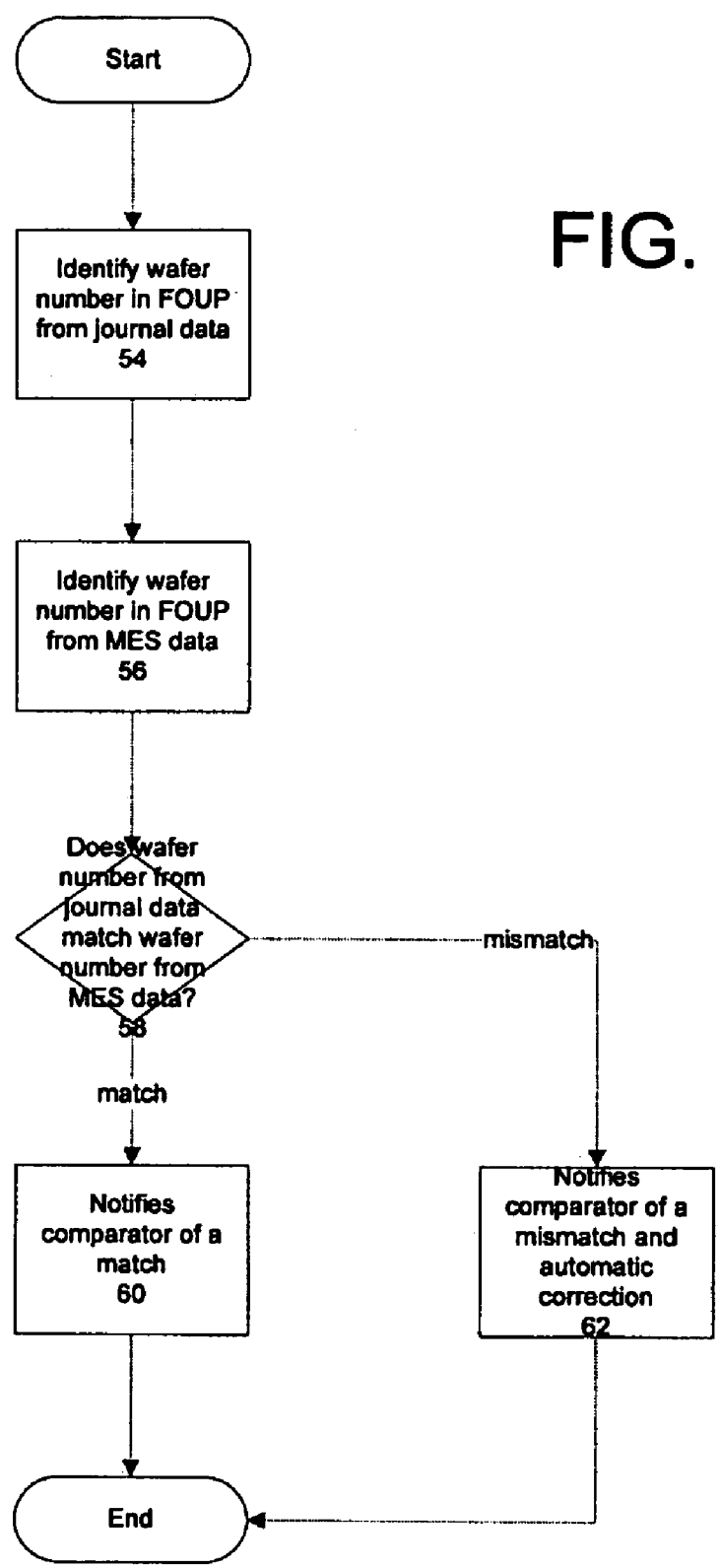

SYSTEM AND METHOD FOR CORRECTING MATERIAL AND DATA MISMATCH IN AN AUTOMATED MANUFACTURING ENVIRONMENT

BACKGROUND

Computer Integrated Manufacturing (CIM) has been widely used in semiconductor device fabrication to control material and information flow. Fabrication automation enables efficient and accurate control of material movement and related data is of vital importance to decrease cycle time, reduce waste, and improve yield.

Even in some of the most automated manufacturing environments that use Automated Material Handling Systems (AMHS), some manual handling of materials are inevitable and necessary. When manual handling of materials occurs, there is a risk of a mismatch between the physical location of the material and the data maintained in the computer systems. In other words, the computer data tracking the location and processing of the materials becomes inaccurate and introduces errors in subsequent processing steps. Such material mismatch errors result in delays in cycle time, increased rework and scrap, and decreased yield.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 3 is the partial contents of an exemplary wafer sorter log file.

FIG. 4 is a flowchart of an exemplary implementation of the checker algorithm 42.

DETAILED DESCRIPTION

Figure 1:
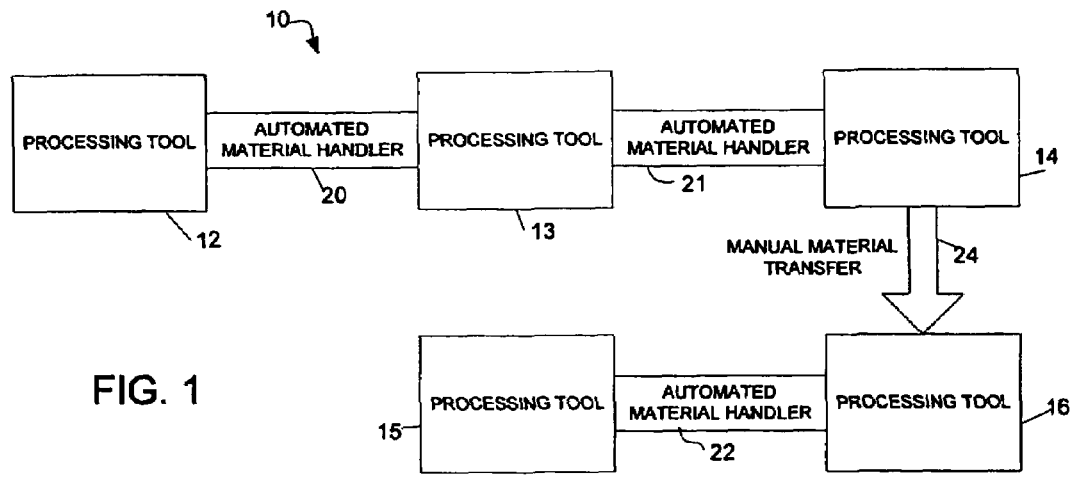
FIG. 1 is a simplified block diagram of an exemplary manufacturing environment.

FIG. 1 is a simplified block diagram of an exemplary manufacturing environment 10. Manufacturing environment 10 may be a semiconductor device foundry or any automated or semi-automated manufacturing environment where the control of material flow and the accuracy of data related to the material flow are of vital importance. In such environments, inaccurate data identifying the processing and location of the materials may result in significant reduction in yield, cross-contamination of materials, increase in cycle time, and higher production of wasted materials.

Manufacturing environment 10 comprises a plurality of fabrication processing tools and equipment 12-16. In a semiconductor fabrication facility, processing tools 12-16 may be stand-alone equipment or clusters of equipment. These processing tools include equipment that perform processes such as chemical-mechanical polishing, etching, film production, photolithography, cleaning, testing, etc. to form semiconductor devices on wafer substrates. These processing tools are generally fully automated to accept wafers housed in carriers such as FOUPs (front opening unified pods), FOSBs (front opening shipping boxes), and cassettes, and perform predetermined processes according to prescribed recipes. The materials, or wafers in the case of a semiconductor foundry, are transported via automated material handlers 20-22 of an Automated Material Handling System (AMHS) that are operable to retrieve the wafers from the processing tools and transport them to the next processing tool for further processing. These automated material handlers may include conveyors, rails, overhead tracks, turn tables, robotics, stockers, etc. A manufacturing execution system (MES) is used to tracking the work-in-progress and the flow of materials and data.

While many advanced manufacturing environments have been automated, most still employ some form of manual material handling. For example, the transfer of materials 24 between processing tools 14 and 16 are done manually. For example in semiconductor foundries, manual handling and transportation of wafers are still commonly used for tool monitoring or process verification. When manual handling of materials occur, unless the human operator carefully updates the manufacturing execution system, the data records in the manufacturing execution system no longer matches the physical locations of the materials.

Figure 2:
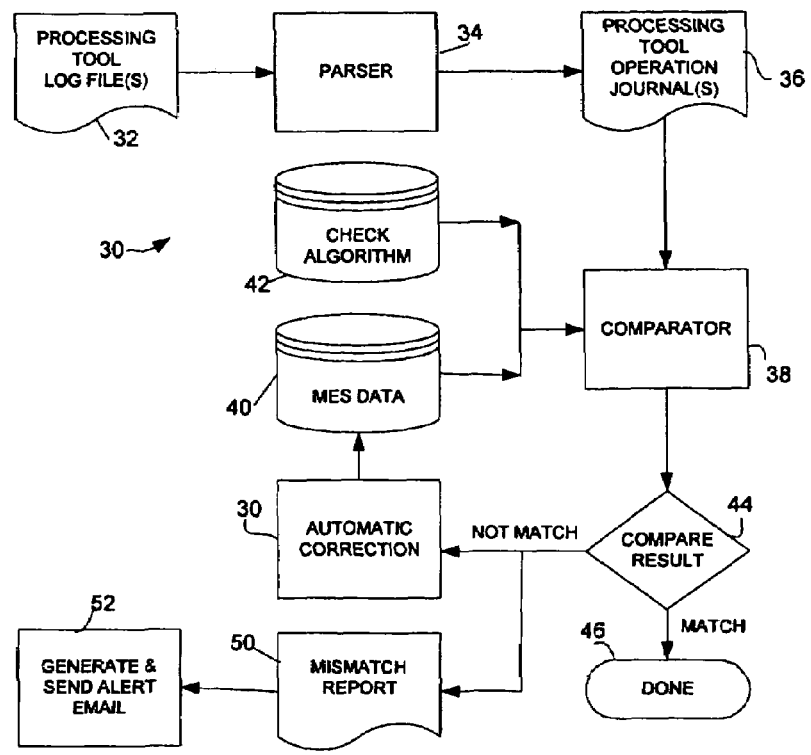
FIG. 2 is a simplified data flow diagram of an embodiment of a system and method for correcting material and data mismatch in an automated manufacturing environment.

FIG. 2 is a simplified data flow diagram of an embodiment of a system and method for correcting material and data mismatch in an automated manufacturing environment 30. System 30 is operable to access a processing tool log file 32 in real-time or over a predetermined desired time period (e.g., daily, every four hours, every eight hours, etc.) containing detailed transaction records of the materials handled or processed by a processing tool. The log file is a file containing a detailed description of the material content of certain wafer handling equipment that is automatically generated. An example of a log file 32 that describes the transactions handled by a wafer sorter is provided in FIG. 3. Processing tool log file 32 is provided as an input to a parser 34, which is operable to read the contents of the log file, which is typically in a proprietary data format. The parser then selects and parses out certain data, and generates an operation journal 36 containing the parsed data arranged in a known data format. Operational journal 36 may identify the wafer carrier(s) located at the tool, the number of wafers in the carrier, associated timestamp (dates and times), and other suitable data. For example, operation journal 36 may include the following data, for example:

Mon May 10 19:39:01 2005
 PFB000139: 10 wafers
 PFF000501: 3 wafers

In the example above, the operation journal content indicates that wafer carrier PFB000139 contains ten wafers, and wafer carrier PFF000501 contains three wafers on Monday, May 10, 2005, The processing tool operation journal of the tool is then provided to a comparator 38 for comparison with stored MES data 40 automatically generated by the manufacturing execution system. Comparator 38 determines whether there are discrepancies between operation journal data 36 and MES data 40 based on a checker algorithm 42, and generates a comparison result 44. More details regarding the checker algorithm is discussed below with reference to FIG. 4. If there is a match between the data in the operation journal, which is indicative of the actual transactions that occurred at the tool, and the MES data, which is indicative of what the Automated Material Handling Systems (AMHS)

believes occurred at the tool, then the process ends in block 46 until the next execution iteration at the predetermined interval. As described above, comparisons may be performed in real-time or on a periodic basis, such as every four hours, every shift, daily, etc.

If the comparison results show that there is a mismatch or discrepancy between the MES data and the operation journal data, then the MES data may be automatically updated by a correction process 48 so that it is in agreement with the operation journal data. Therefore, the MES data now reflects the reality and provides an accurate picture of where the wafers are located. Alternatively or in combination with the automatic correction, a mismatch report 50 is generated and sent to a user or operator. The mismatch report may be transmitted to the operator in an electronic mail (email) message or other means. The mismatch alert email may contain the following data:

Mismatch Wafer Count for PFB000139 was found @ Mon May 10 19:39:01 2005:
  Wafers in FOUP: 10 pcs
  Wafers in MES: 8 pcs This alert indicates that on the specified date and time, the carrier with the identifier PFB000139 contains ten wafers according to the equipment log file/operation journal, but the MES data shows that it only contains eight wafers. Therefore, there is a mismatch between the MES data and the operation journal data that requires attention. An operator may manually update the MES data to match the operation journal data if automatic correction is not performed.

Components or functions 34, 38, 44, 48, 50, and 52 shown in FIG. 2 may be implemented as a single application executing on a computing platform or as more than one modules operable to execute across multiple computing platforms arranged in a distributed architecture. The system may monitor and target errors that may occur at a single processing tool, a subset of processing tools, or all the processing tools operating in a semiconductor fabrication facility.

Operating in this manner, MES data or other data used to track material processing and material flow is checked for accuracy against data generated by the processing equipment or tool so that discrepancies, if found, can be corrected and updated. The accuracy of the MES data will result in increased yield, less waste, and a reduction in cycle time.

FIG. 4 is a flowchart of an exemplary implementation of the checker algorithm 42. The process begins at step 54 when a wafer number in the front opening unified pods (FOUP) is identified from the journal data of the operation journal 36. At step 56, a wafer number in the front opening unified pods (FOUP) is identified from MES data 40. At step 58, a determination is made by the checker algorithm 42 as to whether the wafer number in FOUP from the journal data matches the wafer number in FOUP from the MES data.

At step 60, if the wafer number in FOUP from the journal data matches the wafer number in FOUP from the MES data, the comparator is notified of a match and the process terminates thereafter. At step 62, if the wafer number in FOUP from the journal data does not match the wafer number in FOUP from the MES data, the comparator is notified of a mismatch and automatic correction. Thus, the process terminates thereafter.

Figure 5:
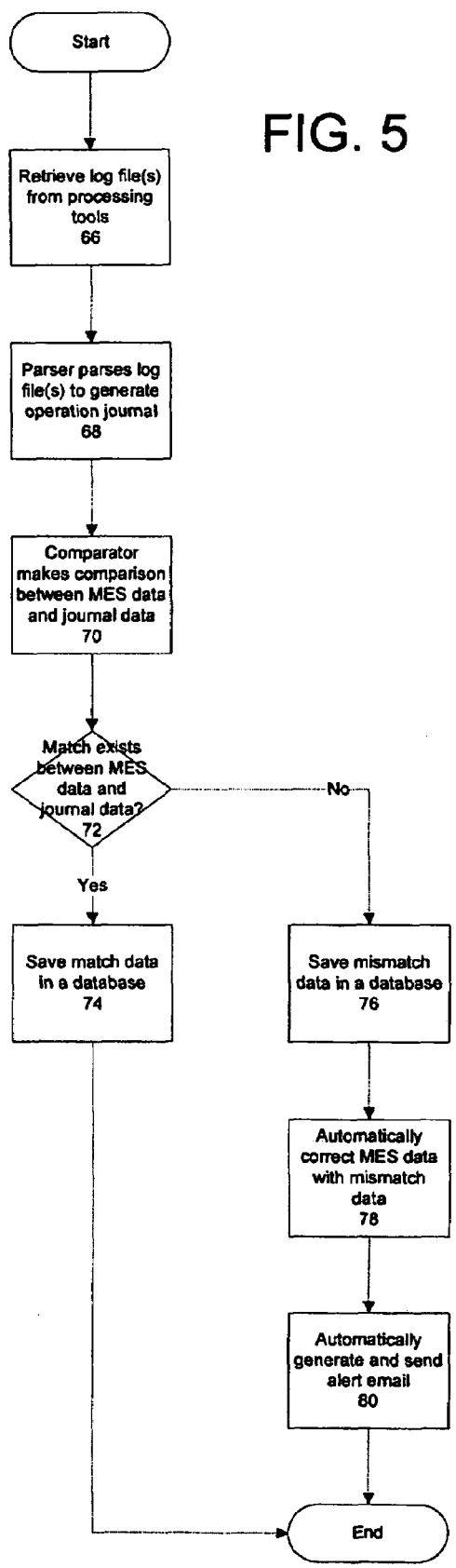
FIG. 5 is flowchart of exemplary implementation of a method for correcting material and data mismatch in an automated manufacturing environment 30.

FIG. 5 is flowchart of exemplary implementation of a method for correcting material and data mismatch in an automated manufacturing environment 30. The process begins at step 66 when the log file(s) are retrieved from the processing tools. At step 68, the parser 34 parses the log file(s) to generate the operation journal. At step 70, the comparator 38 makes a comparison between the MES data 40 and the data of the operation journal 36 based on the checker algorithm 42. At step 72, a determination is made by the checker algorithm 42 as to whether a match exists between the MES data 40 and the data of the operation journal 36.

At step 74, if a match exists between the MES data 40 and the data of the operation journal 36, the match data is saved into a database and the process terminates thereafter. However, at step 76, if no match exists between the MES data 40 and the data of the operation journal 36, the mismatch data is saved into a database. At step 78, the MES data 40 is automatically corrected using the mismatch data. At step 80, an alert email is automatically generated and sent to alert manufacturing of the mismatch. Thus, the process terminates thereafter.

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims.

What is claimed is:

1. A system comprising:
   a parser operable to receive a log file containing detailed processing tool transactional data and generate an operation journal containing a subset of the detailed processing tool transactional data arranged in a known format;
   a comparator operable to receive automated material tracking data, and compare with the operation journal data; and
   an automatic correction module operable to automatically correct the automated material tracking data in response to a discrepancy between the automated material tracking data and the operation journal data.

2. The system of claim 1, including the comparator to further generate an electronic email alert in response to a discrepancy detected between the automated material tracking data and the operation journal data.

3. The system of claim 1, including the comparator to further generate a mismatch report in response to a discrepancy detected between the automated material tracking data and the operation journal data.

4. The system of claim 1, including the operation journal to comprise unique identifiers of material carriers located at a processing tool, a quantity of materials carried by each carrier, and timestamp.

5. The system of claim 1, further comprising the log file to contain detailed processing tool data of a predetermined time period.

6. The system of claim 1, further comprising the log file to contain detailed processing tool data in real time.

7. A system comprising:
   a parser operable to receive a log file containing detailed processing tool transactional data and generate an operation journal containing a subset of the detailed processing tool transactional data arranged in a known format; and
   a comparator operable to receive automated material tracking data, compare with the operation journal data, and generate an electronic alert in response to a discrepancy between the automated material tracking data and the operation journal data.

8. The system of claim 7, further comprising an automatic correction module operable to automatically correct the automated material tracking data in response to a discrepancy detected between the automated material tracking data and the operation journal data.

9. The system of claim 7, including the comparator to further generate a mismatch report in response to a discrepancy detected between the automated material tracking data and the operation journal data.

10. The system of claim 7, including the operation journal to comprise unique identifiers of material carriers located at a processing tool, a quantity of materials carried by each carrier, and timestamp.

11. The system of claim 7, further comprising the log file to contain detailed processing tool data of a predetermined time period.

12. The system of claim 7, further comprising the log file to contain detailed processing tool data in real time.

13. A method comprising:
   receiving a log file containing detailed processing tool transactional data and generating an operation journal containing a subset of the detailed processing tool transactional data arranged in a known format;
   receiving automated material tracking data and comparing the automated material tracking data with the operation journal data; and
   automatically correcting the automated material tracking data in response to detecting a discrepancy between the automated material tracking data and the operation journal data.

14. The method of claim 13, further comprising generating an electronic email alert in response to a discrepancy detected between the automated material tracking data and the operation journal data.

15. The method of claim 13, further comprising generating a mismatch report in response to a discrepancy detected between the automated material tracking data and the operation journal data.

16. The method of claim 13, including generating an operation journal to comprise providing unique identifiers of material carriers located at a processing tool, a quantity of materials carried by each carrier, and timestamp.

17. The method of claim 13, wherein receiving a log file comprises receiving the log file containing detailed processing tool data of a predetermined time period.

18. The method of claim 13, wherein receiving a log file comprises receiving a log file containing detailed processing tool data substantially in real time.

19. A computer-readable medium having encoded thereon a process comprising:
   receiving a log file containing detailed processing tool transactional data and generating an operation journal containing a subset of the detailed processing tool transactional data arranged in a known format;
   receiving automated material tracking data and comparing the automated material tracking data with the operation journal data; and
   automatically correcting the automated material tracking data in response to detecting a discrepancy between the automated material tracking data and the operation journal data.

20. The computer-readable medium of claim 19, further comprising generating an electronic email alert in response to a discrepancy detected between the automated material tracking data and the operation journal data.

21. The computer-readable medium of claim 19, further comprising generating a mismatch report in response to a discrepancy detected between the automated material tracking data and the operation journal data.

22. The computer-readable medium of claim 19, including generating an operation journal to comprise providing unique identifiers of material carriers located at a processing tool, a quantity of materials carried by each carrier, and timestamp.

23. The computer-readable medium of claim 19, wherein receiving a log file comprises receiving the log file containing detailed processing tool data of a predetermined time period.

24. The computer-readable medium of claim 19, wherein receiving a log file comprises receiving a log file containing detailed processing tool data substantially in real time.

* * * * *